United States Patent Office 3,053,795
Patented Sept. 11, 1962

3,053,795
POLYPHOSPHITES AND BLENDS THEREOF
WITH POLYESTERS
Harry W. Coover, Jr., and Richard L. McConnell, Kingsport, Tenn., assignors to Eastman Kodak Company, Rochester, N.Y., a corporation of New Jersey
No Drawing. Filed Sept. 7, 1955, Ser. No. 533,002
12 Claims. (Cl. 260—45.4)

This invention relates to aromatic polyphosphites and their utilization as heat and light stabilizers for the well known polyesters. It also relates to stabilized polyesters comprising these new aromatic polyphosphites.

It is known that polyesters are often unstable when subjected to the effects of heat and light for any period of time. For example, polyesters which are clear, white or have some other definite coloration will tend to discolor under prolonged exposure to light. Polyesters also will undergo various changes due to breaking down of their structure and suffer other deleterious effects when exposed to heat. When a polyester product is to be used for purposes which would expose it to these conditions, it will not be of commercial utility unless it is stabilized against such. This is particularly important in the synthetic fiber field where the polyester fibers are to be woven into cloth.

Although polyphosphites different from those of this invention are known to the art as stabilizers for oils against the degradation which normally occurs due to the oxidation of the hydrocarbon components, and have also been used to prevent coloration in the manufacture of ester products from "Oxo" alcohols, the hitherto unknown polyphosphites of this invention are primarily useful in the heat and light stabilization of polyesters. It is highly desirable to provide materials which will stabilize polyesters against the adverse effects of heat and light over a long period of time to an extent not possible heretofore.

A principal object of our invention is to provide new and improved compounds which, in addition to being good stabilizers against the effects of heat on polyesters, have the characteristic, when incorporated with polyesters, of yielding a product which is remarkably stable under the effects of light. It is another object of this invention to provide a commercially advantageous means for stabilizing polyesters against the effects of heat and light. A further object is to provide polyesters which can be manufactured into products which can be subjected to long exposure to light and to prolonged adverse heat conditions without decomposition, discoloration, and other deleterious effects normally encountered with unstabilized polyesters or polyesters containing the stabilizers known to the art. A still further object of this invention is to provide polyphosphites which can be incorporated with other polyester stabilizers to provide superior polyester films, fibers, molded objects and the like. Other objects will be apparent from the description and claims which follow.

These and other objects are attained by our invention which comprises the new polyphosphites having a polymeric structure consisting of recurring structural units of the formula

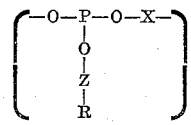

wherein R is selected from the group consisting of hydrogen and hydrocarbon radicals containing from 1–8 carbon atoms, and X and Z each represent one of the nuclearly attached aromatic radicals of the formulas

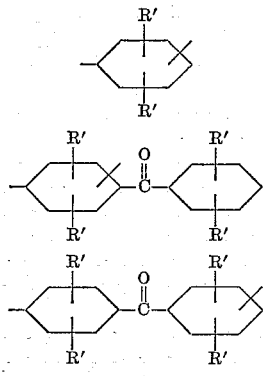

wherein R' can be the same or different groups and can be hydrogen, hydrocarbon radicals containing from 1–8 carbon atoms or alkoxy groups containing from 1–4 carbon atoms. The two valence linkages of the aromatic nuclei are separated by at least one carbon atom, and represent the valance linkages at which the X and Z groups enter into the polymeric structure. At least one of the X and Z groups must contain a

group. These polyphosphites, when incorporated with the well known polyesters or mixtures thereof, provide a product which is remarkably stable under the effect of heat and light. A particularly desirable embodiment of our invention consists in the utilization of polyphosphites as defined above wherein the X and Z each are selected from the group of bivalent aromatic radicals consisting of:

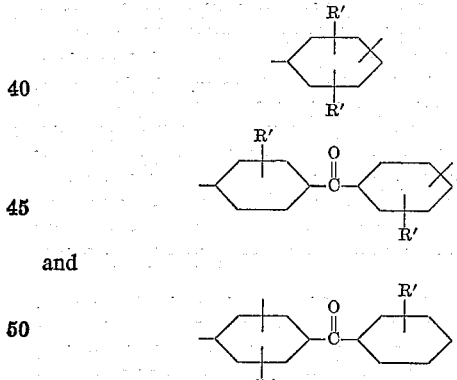

and

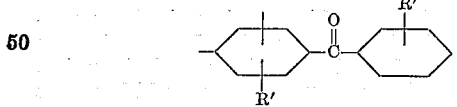

These polyphosphites will vary in degree of polymerization depending upon the amount of reactants used, reaction conditions and similar variable factors, but will usually be of a molecular weight of at least 900.

The polyphosphites of the invention can be advantageously prepared by any of the well known methods for making polymeric polyphosphites, and the compounds of this invention are readily made by condensing phosphorus trichloride with a mono-hydroxy aromatic compound and a dihydroxy aromatic compound whose hydroxyl groups are separated by at least one carbon atom, at least one of the aromatic compounds being a benzophenone. The mono-hydroxy aromatic compounds can include phenols which can include alkyl phenols, aryl phenols and alkoxy phenols. Hydroxy benzophenones, with or without substituent hydrocarbon and alkoxy chains can be used. The dihydroxy aromatic compounds which can be used in a preferred embodiment of the invention include substituted hydroquinones or resorcinols, hydroquinone, resorcinol and dihydroxy benzophenone, with or without substituent hydrocarbon or alkoxy chains. Other carbocyclic hydroxy aromatic compounds which react with the other reactants to fulfill the requirements of the general formula also can be used. It is desirable to use dihydroxy aromatic compounds whose hydroxyl groups are other than ortho to each other. When the hydroxyl groups are ortho to each other, cyclic phosphites are formed, thereby precluding the possibility of polymer formation. It is necessary to choose the reactants so that at least one of them comprises a benzophenone-type moiety, otherwise the polyposphites will be impractical for the uses contemplated by this invention.

The preferred method of producing the polyphosphites is to react the phosphorus trichloride with the monohydroxy compound for approximately 4 hours in a nitrogen atmosphere. After cooling, the dihydroxy compound is added and the entire mixture is heated in a nitrogen atmosphere for approximately 4 hours, and polymerization effected.

The polyphosphites so produced are usually glass-like solids which can be crushed to a powder. They are soluble in diethyl ether, acetone, and dimethyl formamide and are insoluble in water. They range in color from colorless to a transparent red. Any coloration of the polyphosphite does not affect the coloration of the composition of polyesters or mixture of polyesters with the polyphosphite, since the amounts used are not such as to produce any undesired coloration.

The polyphosphites can be incorporated with various polyesters and mixtures of polyesters in varying amounts depending upon the properties desired in the final product. A preferred embodiment of the invention is to use from .5 to 5 percent by weight of the polyphosphite to that of the total mixture. The resultant compositions are extremely adaptable for varied uses as finished products. They are extremely stable to the effects of heat and light as, for example, even after heating at a temperature of 200° C. for 64 hours no discernible changes occured in products which, under similar conditions and in the absence of stabilizer, suffer decomposition and discoloration to a degree seriously affecting their commercial utilization.

Accelerated light exposure tests were carried out in a DL-TS Atlas Twin Arc Weather-Ometer. A thin transparent strip of polyester derived from 60 moles percent azelaic acid, 40 moles percent 4,4'-sulfonyldibenzoic acid, and 1,4-butanediol was extremely brittle after 24 hours' exposure. A similar strip of polyester containing 1 part of a polyphosphite derived from phosphorus trichloride, p-octylphenol, and 2,4-dihydroxybenzophenone was still very tough after 48 hours and was only slightly brittle after 72 hours.

Any of the well known highly polymeric linear crystalline polyesters having a characteristic X-ray diffraction pattern can be used in the practice of this invention. However, among the preferred polyesters which can be used are those produced by reacting a dibasic acid with a glycol; in particular the polyesters of the sulfonyl dibenzoic acids and glycols such as tetramethylene glycol, pentamethylene glycol, hexamethylene glycol, etc., have been found to be extremely useful. The terephthalic polyesters also have been found to be quite useful. The polyesters can be produced by any of the means well known to the art, including mass and batch polymerization.

The following examples illustrate certain preferred embodiments of the the invention, including the production of polyphosphites and the preparation of the stabilized polyesters.

*Example 1*

Phosphorus trichloride (0.3 mole) was mixed with p- (1,1,3,3-tetramethylbutyl) phenol (0.3 mole) in a 250 ml. flask and gradually heated from 25° C. to 135° C. over a four-hour period. Dry nitrogen was passed through the system continually to sweep out the liberated hydrogen chloride and to prevent oxidation of the phosphorus trichloride. At the end of four hours, the evolution of hydrogen chloride had practically ceased. The crude p-octylphenyl dichlorophosphite was a straw-colored liquid.

After cooling the flask to 25° C., 2,4-dihydroxybenzophenone (0.3 mole) was added and the temperature was gradually raised from 25° C. to 175° C. under nitrogen. The liberation of hydrogen chloride was complete after about four hours. The crude polyphosphite was cooled to room temperature and dissolved in diethyl ether. This ether solution was washed twice with a dilute sodium bicarbonate solution and then twice with water. After drying the organic solution over sodium sulfate, the ether was stripped off on a steam bath. Then the residue was evacuated under reduced pressure to a temperature of 100° C. The resulting product was neutral and contained no chlorine.

*Example 2*

Similar results were obtained employing phosphorus trichloride, phenol and 2,4-dihydroxy-4'-phenylbenzophenone.

*Example 3*

Phosphorus trichloride (0.3 mole) was mixed with 2-hydroxy - 4,4' - dimethoxybenzophenone and gradually heated from 25° C. to 140° C. over a four-hour period, passing dry nitrogen through the system continually. The mixture was cooled and 2,5-di-tert-butyl hydroquinone was added and the temperature was raised to 180° C. under dry nitrogen. The heating was continued for slightly over four hours. The crude polyphosphite was cooled and dissolved in diethyl ether, washed with a dilute sodium bicarbonate solution and then with water. The product was dried and the ether was removed. The residue was evacuated under reduced pressure to a temperature of 100° C. The product contained no chlorine and tested neutral.

*Example 4*

The phosphorus trichloride (.3 mole) was mixed with p-octylphenol (.3 mole) and gradually heated from 25° C. to 135° C. over four-hour period; dry nitrogen was continuously passed through the system. The mixture was cooled and 4,4'-dihydroxy benzophenone (.3 mole) was added, and the temperature was raised to 178° under dry nitrogen. Heating was continued for slightly over four hours. The crude polyphosphite was cooled and dissolved in diethyl ether and was washed with a dilute solution of sodium bicarbonate and then with water. The product was dried and the ether removed on a steam bath. The residue was evacuated under reduced pressure to a temperature of 100° C. The product was neutral and contained no chlorine.

Similar results were obtained using the same procedure with other reactants as defined herein. The other polyphosphites so produced were also soluble in diethyl ether, acetone and dimethyl formamide.

*Example 5*

A polyester derived from 60 mole percent azelaic acid, 40 mole percent 4,4'-sulfonyldibenzoic acid, and 1,4-butanediol was mixed with one percent by weight of a polyphosphite derived from phosphorus trichloride, p-octylphenol, and 2,4-dihydroxybenzophenone (Example 1) and extruded into film 50 mil thick. The following table gives the results obtained when samples of this film, as well as a blank containing no polyphosphite, were heated in an air oven at 200° C. The viscosities ($\eta$) reported are logarithmic viscosity numbers which are defined as follows:

$$\eta = \frac{\text{Natural log relative viscosity}}{\text{Concentration in g. per 100 cc.}}$$

where the relative viscosity is the ratio of the solution flow time to the solvent flow time. The determinations were effected in 0.25% solutions at 25° C. using a 60% phenol/40 percent tetrachloroethane mixture (by weight) as the solvent.

|  | $\eta$ at Start | $\eta$ After 15 Hr. at 200° C. | $\eta$ After 64 Hr. at 200° C. |
|---|---|---|---|
| 1. Sample containing polyphosphite. | 1.03 | 0.93 (film tough). | 0.56 (film tough). |
| 2. Blank | 1.09 | 0.07 (film brittle). | 0.05 (film very brittle). |

The sample containing the polyphosphite (1) was still transparent with no coloration after 64 hours at 200° C.; however, the blank (2) was black and completely degraded as shown by the viscosity.

These samples were also subjected to accelerated light exposure tests. The tests were carried out in a DL-TS Atlas Twin Arc Weather-Ometer modified by the addition of twelve Westinghouse fluorescent sun lamps and operated at a black panel temperature of 150° F. The blank was extremely brittle after 24 hours' exposure. The polyphosphite-containing sample was still very tough after 48 hours, and began to get brittle only after 72 hours' exposure.

*Example 6*

A polyester derived from 4,4'-sulfonyldibenzoic acid and 1,5-pentanediol was extruded into film 50 mils thick containing 0.5 percent by weight of a polyphosphite derived from phosphorus trichloride, p-octylphenol, and 4,4'-dihydroxybenzophenone (Example 4). The following data was obtained by heating samples of this film along with a blank at 200° C. in an air oven.

|  | $\eta$ at Start | $\eta$ After 15 Hr. | $\eta$ After 64 Hr. |
|---|---|---|---|
| 1. Sample containing polyphosphite | 0.77 | 0.64 | 0.51 |
| 2. Blank | 0.73 | 0.49 | 0.32 |

The stabilized sample was still transparent after 64 hours; however, the blank was very dark.

Similar results were obtained using other polyesters and mixtures of polyesters with the polyphosphites of this invention.

Mixtures of the polyphosphites of the invention with other stabilizers were found, when mixed with polyesters, to provide products which were extremely stable and have very useful properties. These and other such polyphosphite-polyester compositions can be used in the manufacture of molded articles, extruded products, films, fibers, textiles, and the like.

Thus the polyphosphites produced and used according to the practice of this invention have been found to possess unusual utility in the polyester field, and have made possible the manufacture of products which have heretofore been impractical to produce.

Although the invention has been described in considerable detail with particular reference to certain preferred embodiments thereof, variations and modifications can be effected within the spirit and scope of the invention as described hereinabove and as defined in the appended claims.

We claim:
1. A polyphosphite, having molecular weight of at least 900 and a polymeric structure consisting essentially of a plurality of recurring structural units of the formula

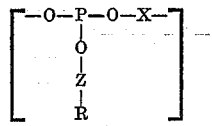

wherein R is selected from the group consisting of hydrogen and hydrocarbon radicals containing from 1 to 8 carbon atoms, and X and Z each represents a nuclearly attached aromatic radical selected from the group of radicals consisting of

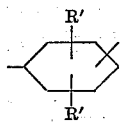

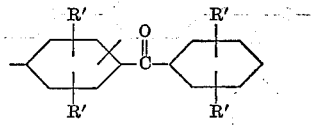

and

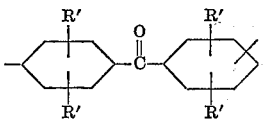

R' being selected from the group consisting of hydrogen, hydrocarbon radicals containing from 1 to 8 carbon atoms, and alkoxy radicals containing from 1 to 4 carbon atoms, the two valence linkages of the aromatic nuclei, being separated by at least one carbon atom, at least one of said X and Z groups containing a

group.

2. A polyphosphite as defined by claim 1 having molecular weight of at least 900 and a polymeric structure consisting essentially of a plurality of structural units of the formula

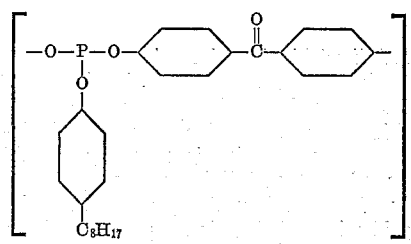

3. A polyphosphite as defined by claim 1 having molecular weight of at least 900 and a polymeric structure consisting essentially of a plurality of structural units of the formula

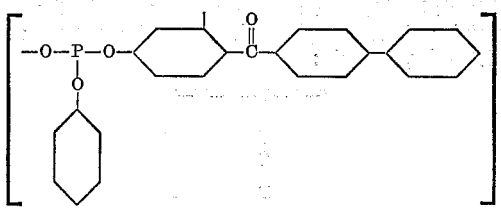

4. A polyphosphite as defined by claim 1 having molecular weight of at least 900 and a polymeric structure consisting essentially of a plurality of structural units of the formula

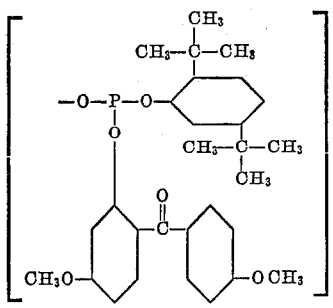

5. A polyphosphite as defined by claim 1 having molecular weight of at least 900 and a polymeric structure consisting essentially of a plurality of structural units of the formula

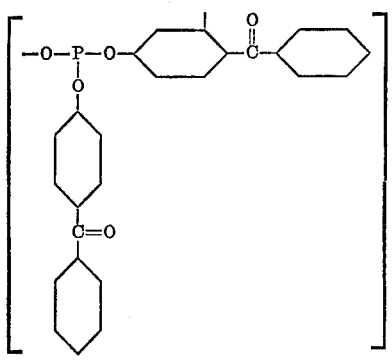

6. A polyphosphite as defined by claim 1 having molecular weight of at least 900 and a polymeric structure consisting essentially of a plurality of structural units of the formula

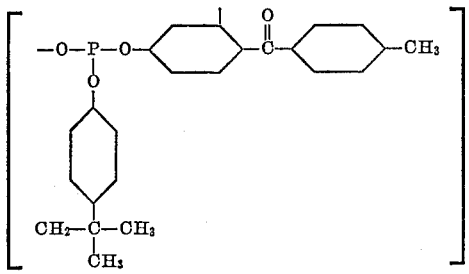

7. A stabilized highly polymeric linear polyester composition which is stable at 200° C. in air against brittleness and discoloration and can be cold drawn to form fibers exhibiting a crystalline characteristic X-ray diffraction pattern and which is normally unstable under the effects of heat and light, said polyester consisting essentially of the condensation produce of a bifunctional dibasic acid with a bifunctional glycol, which polyester composition contains from 0.5 to 5 percent by weight of the total composition of a polyphosphite having a molecular weight of at least 900 and such that it is soluble in a solvent selected from the group consisting of diethyl ether, acetone and dimethyl formamide and can be blended with said polyester and wherein the recurring units of the polyphosphite molecular structure have the following formula:

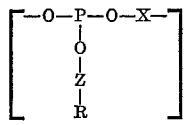

wherein R is selected from the group consisting of hydrogen and hydrocarbon radicals containing from 1 to 8 carbon atoms, and X and Z each represents a nuclearly attached aromatic radical selected from the group of radicals consisting of

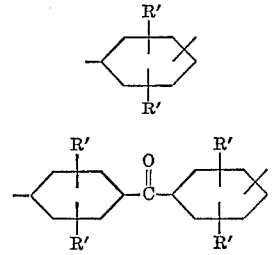

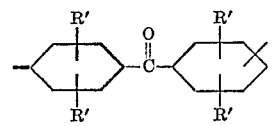

and

R' being selected from the group consisting of hydrogen, hydrocarbon radicals containing from 1 to 8 carbon atoms, and alkoxy radicals containing from 1 to 4 carbon atoms, the two valence linkages of the aromatic nuclei being separated by at least one carbon atom, at least one of said X and Z groups containing a $$-\overset{O}{\underset{\|}{C}}-$$

group, which polyester composition is further characterized in that thin strips substantially retain their properties of toughness and good color (1) when exposed to an accelerated simulated sunlight test for at least 48 hours and (2) when held at 200° C. in air for at least 15 hours.

8. A polyester composition as defined by claim 7 wherein the recurring units have the following formula:

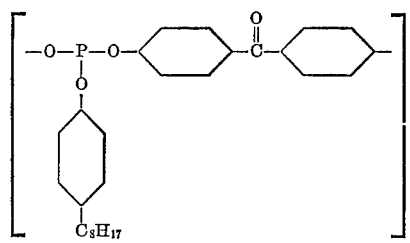

9. A polyester composition as defined by claim 7 wherein the recurring units have the following formula:

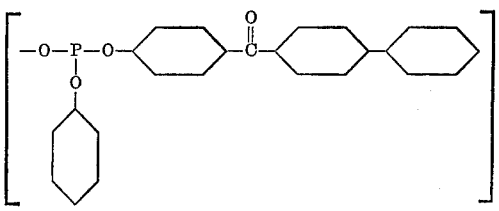

10. A polyester composition as defined by claim 7 wherein the recurring units have the following formula:

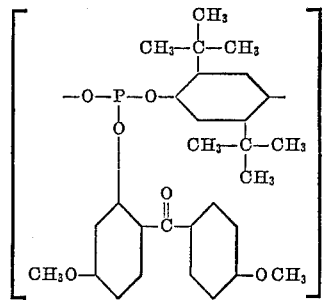

11. A polyester composition as defined by claim 7 wherein the recurring units have the following formula:
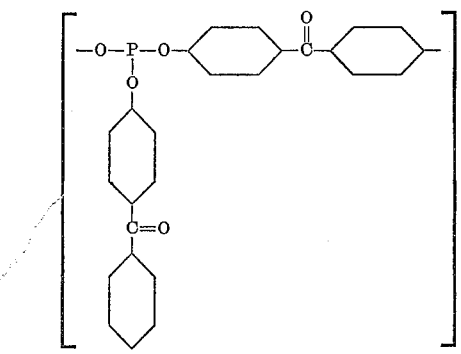
12. A polyester composition as defined by claim 7 wherein the recurring units have the following formula:
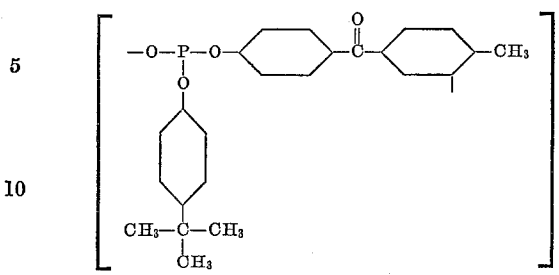
References Cited in the file of this patent
UNITED STATES PATENTS
2,612,488   Nelson _____ Sept. 30, 1952
FOREIGN PATENTS
588,834   Great Britain _____ June 4, 1947

UNITED STATES PATENT OFFICE
CERTIFICATE OF CORRECTION

Patent No. 3,053,795            September 11, 1962

Harry W. Coover, Jr., et al.

It is hereby certified that error appears in the above numbered patent requiring correction and that the said Letters Patent should read as corrected below.

Column 7, lines 3 to 15, the structural formula should appear as shown below instead of as in the patent:

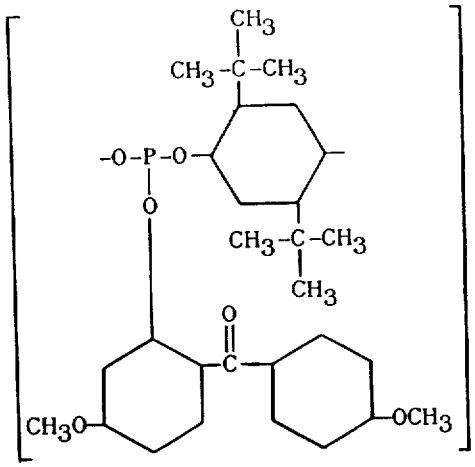

Column 8, lines 52 to 60, the structural formula should appear as shown below instead of as in the patent:

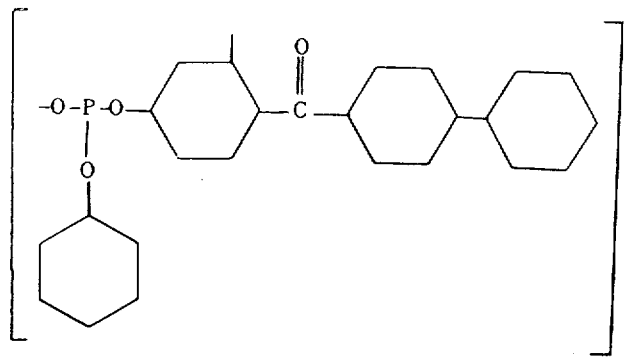

Signed and sealed this 19th day of March 1963.

(SEAL)
Attest:

ESTON G. JOHNSON
Attesting Officer

DAVID L. LADD
Commissioner of Patents